US012645183B2

(12) United States Patent
Stranczl

(10) Patent No.: US 12,645,183 B2
(45) Date of Patent: Jun. 2, 2026

(54) DIAPHRAGM TYPE DEPLOYMENT DEVICE, PARTICULARLY FOR WATCHMAKING

(71) Applicant: Montres Breguet S.A., L'Abbaye (CH)

(72) Inventor: Marc Stranczl, Nyon (CH)

(73) Assignee: Montres Breguet S.A., L'Abbaye (CH)

( * ) Notice: Subject to any disclaimer, the term of this patent is extended or adjusted under 35 U.S.C. 154(b) by 800 days.

(21) Appl. No.: 17/815,708

(22) Filed: Jul. 28, 2022

(65) Prior Publication Data

US 2023/0057054 A1 Feb. 23, 2023

(30) Foreign Application Priority Data

Aug. 20, 2021 (EP) .................................... 21192337

(51) Int. Cl.
*G04B 19/16* (2006.01)

(52) U.S. Cl.
CPC .................................... *G04B 19/16* (2013.01)

(58) Field of Classification Search
CPC ....... G04B 19/16; G04B 17/045; G04B 13/02
See application file for complete search history.

(56) References Cited

U.S. PATENT DOCUMENTS 11,460,811 B2 * 10/2022 Semon .................... G04B 1/22
2013/0176829 A1 7/2013 Cusin et al.
2015/0037024 A1 2/2015 Zhou et al.
2019/0011887 A1 * 1/2019 Mallet .................. G04B 43/002
2021/0034016 A1 * 2/2021 Helfer .................... G04B 17/32
2023/0055934 A1 2/2023 Stranczl

FOREIGN PATENT DOCUMENTS

CH 703 464 A2 1/2012
CN 115903430 A 4/2023
EP 2 998 800 A2 3/2016
EP 3 671 370 A1 6/2020

(Continued)

OTHER PUBLICATIONS

Machine Translation of EP3671370.*

(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

A diaphragm type deployment device including a first rigid armature and a second deformable armature, the first rigid armature and the second deformable armature being connected to one another, such that the second deformable armature switches from a first extended configuration to a second compact configuration, and vice versa, the device defining a first geometry when the second deformable armature is in the first extended configuration, and defining a second smaller geometry than the first geometry, when the second deformable armature is in the second compact configuration, the device extending substantially in the same plane when the second armature is in the first or in the second configuration, wherein at least a first part of the first rigid armature and at least a first part of the second deformable armature form a first one-piece assembly, preferably from the same material.

25 Claims, 7 Drawing Sheets

(56) References Cited

FOREIGN PATENT DOCUMENTS

| | | | |
|---|---|---|---|
| FR | 1.362.611 | | 6/1964 |
| FR | 3 069 139 | A1 | 1/2019 |
| JP | 2023-29285 | A | 3/2023 |
| WO | 2015/096976 | A2 | 7/2015 |

OTHER PUBLICATIONS

Combined Chinese Office Action and Search Report issued Apr. 9, 2024 in Chinese Patent Application No. 202210999705.3 (with English translation of Category of Cited Documents), 9 pages.

European Search Report Issued on Jan. 12, 2022 in European Application 21192337.0, Filed on Aug. 20, 2021 (with English Translation of Categories of Cited Documents), 3 Pages.

Notice of Reasons for Refusal issued Sep. 5, 2023 in Japanese Patent Application No. 2022-129168, (with English language translation), 21 pages.

* cited by examiner

DIAPHRAGM TYPE DEPLOYMENT DEVICE, PARTICULARLY FOR WATCHMAKING

CROSS-REFERENCE TO RELATED APPLICATION

This application claims priority to European Patent Application No. 21192337.0 filed on Aug. 20, 2021, the entire disclosure of which is hereby incorporated herein by reference.

TECHNICAL FIELD OF THE INVENTION

The invention relates to a diaphragm type deployment device, particularly for watchmaking.

The invention also relates to a timepiece including such a deployment device.

TECHNOLOGICAL BACKGROUND

Diaphragm type deployment devices are elements having an armature which can switch from a compact configuration, wherein the device has a reduced volume or geometry, to an extended configuration, wherein the device has a larger volume or geometry.

These devices are frequently used in watchmaking, in particular in display devices or in devices for driving, or locking the axis of rotation of a wheel.

In display devices, they can serve as a removable screen to hide a portion or all of an item of information shown by the display device. In the compact configuration, the information is uncovered in order to be visible, for example by the wearer of a watch comprising the display device, whereas in the extended configuration, the device covers the information.

Examples of display devices are disclosed in the documents CH46061, CH711228, DE29521914, DE1985554 or EP1842112.

In another example of application, the document EP3671370 discloses a deployment device for coupling two superposed rotary elements. In the compact configuration, the two elements are coupled by the deployment device in contact with the two elements so that one of the elements drives the other element in rotation. In the extended configuration, the two elements are uncoupled, such that the rotation of one no longer drives the rotation of the other.

Other applications are furthermore possible, for example in a system for locking the rotation of a regulating organ balance. In the extended configuration, the deployment device actuates a lever for locking the balance, while in the compact configuration, the lever is no longer actuated, so as to leave the balance in motion.

However, diaphragm type deployment devices have complex armatures. Indeed, they are formed from a multiplicity of elements joined by hinges, particularly forming pivots between said portions. However, these hinges render the deployment device time-consuming and costly to manufacture, in particular for very small devices for the watchmaking industry.

SUMMARY OF THE INVENTION

The aim of the invention is that of remedying the drawbacks cited above, and it is intended to provide a diaphragm type deployment device, the manufacture whereof is simplified and less expensive.

For this purpose, the invention relates to a diaphragm type deployment device, particularly for watchmaking, the deployment device including a first rigid armature and a second deformable armature, the first rigid armature and the second deformable armature being connected to one another, such that the second deformable armature switches from a first extended configuration to a second compact configuration, and vice versa, the device defining a first geometry when the second armature is in the first extended configuration, and defining a second smaller geometry than the first geometry, when the second armature is in the second compact configuration, the device extending substantially in the same plane when the second armature is in the first or in the second configuration.

The deployment device is remarkable in that at least a first part of the first rigid armature and at least a first part of the second deformable armature form a first one-piece assembly, preferably from the same material.

Thus, it is easier to manufacture the deployment device, because the rigid armature and the deformable armature are formed of one piece. Thus, a step of assembling the two armatures after the manufacture thereof is avoided. Furthermore, it is not necessary to devise hinges between the two armatures, as they are continuously joined, the two armatures forming one integral piece.

Thanks to the device according to the invention, the manufacturing costs are reduced, and diaphragm type deployment devices can be manufactured more quickly, and can be smaller.

The other advantages of this invention are the lack of wear, and the consequences thereof, such as the appearance of play, dust emission, parasitic movements, risk of seizing. The use of hinge lubrication is also avoided. Furthermore, movement is better controlled, limited and more accurate.

According to a specific embodiment of the invention, the entire first rigid armature and the entire second deformable armature form the first one-piece assembly.

According to a specific embodiment of the invention, a second part of the first rigid armature and a second part of the second deformable armature form a second one-piece assembly.

According to a specific embodiment of the invention, the first assembly and the second assembly are superposed on one another.

According to a specific embodiment of the invention, the second deformable armature comprises at least two mobile shutters, preferably four mobile shutters, the shutters being distributed by angular symmetry.

According to a specific embodiment of the invention, the shutters delimit the first opening of the first configuration and the second opening of the second configuration.

According to a specific embodiment of the invention, the material of the device is to be selected from silicon, an Ni/P type nickel-phosphorus alloy, an Fe/Ni/Co/Mo type steel alloy.

According to a specific embodiment of the invention, the second deformable armature comprises first deformable portions and rigid portions assembled in alternation.

According to a specific embodiment of the invention, a first deformable portion connects a rigid portion to a next rigid portion.

According to a specific embodiment of the invention, the second deformable armature comprises second deformable portions connecting one of every two rigid portions to the first rigid armature.

According to a specific embodiment of the invention, the rigid portions connected to the first rigid armature have different shapes from the other rigid portions.

According to a specific embodiment of the invention, each deformable portion comprises a flexible strip connecting by the ends thereof two rigid portions, or a rigid portion and the first rigid armature.

According to a specific embodiment of the invention, the device comprises means for moving at least one rigid portion, preferably several rigid portions, in order to switch the second armature from the extended configuration to the compact configuration and vice versa.

According to a specific embodiment of the invention, the rigid portion(s) moved by the movement means are rigid portions connected to the first rigid armature.

According to a specific embodiment of the invention, the rigid portion(s) moved by the movement means are rigid portions which are not connected to the first rigid armature.

According to a specific embodiment of the invention, the movement means are configured to produce a substantially rectilinear movement of the rigid portion(s).

According to a specific embodiment of the invention, the movement means are configured to produce a rotary movement of the rigid portion(s).

According to a specific embodiment of the invention, the rigid portions connected to the first rigid armature are subjected to a rotary movement about a pivoting point when the second armature switches from the extended configuration to the compact configuration and vice versa.

According to a specific embodiment of the invention, the second deformable armature delimits the outer perimeter of the diaphragm, the first rigid armature being arranged inside said perimeter.

According to a specific embodiment of the invention, the first rigid armature delimits the outer perimeter of the diaphragm, the second armature being arranged inside said perimeter.

According to a specific embodiment of the invention, the first geometry defines a first opening when the second deformable armature is in the first extended configuration, and the second geometry defines a second opening, when the second deformable armature is in the second compact configuration, the first opening being narrower than the second opening.

According to a specific embodiment of the invention, each shutter is arranged on a different rigid portion of the second deformable armature.

According to a specific embodiment of the invention, the first geometry defines a first perimeter when the second deformable armature is in the first extended configuration, and the second geometry defines a second perimeter, when the second deformable armature is in the second compact configuration, the first perimeter being greater than the second perimeter.

According to a specific embodiment of the invention, the second deformable armature comprises at least one sabot, preferably four sabots making it possible to delimit the variable perimeter of the device, each sabot being arranged on a different rigid portion of the second deformable armature.

According to a specific embodiment of the invention, the diaphragm forms a cam in which the geometry is variable.

The invention also relates to a movement of a timepiece including such a deployment device.

BRIEF DESCRIPTION OF THE FIGURES

Further specificities and advantages will emerge clearly from the description given hereinafter, which is by way of indication and in no way limiting, with reference to the appended drawings, wherein.

DETAILED DESCRIPTION OF THE INVENTION

Figure 1:
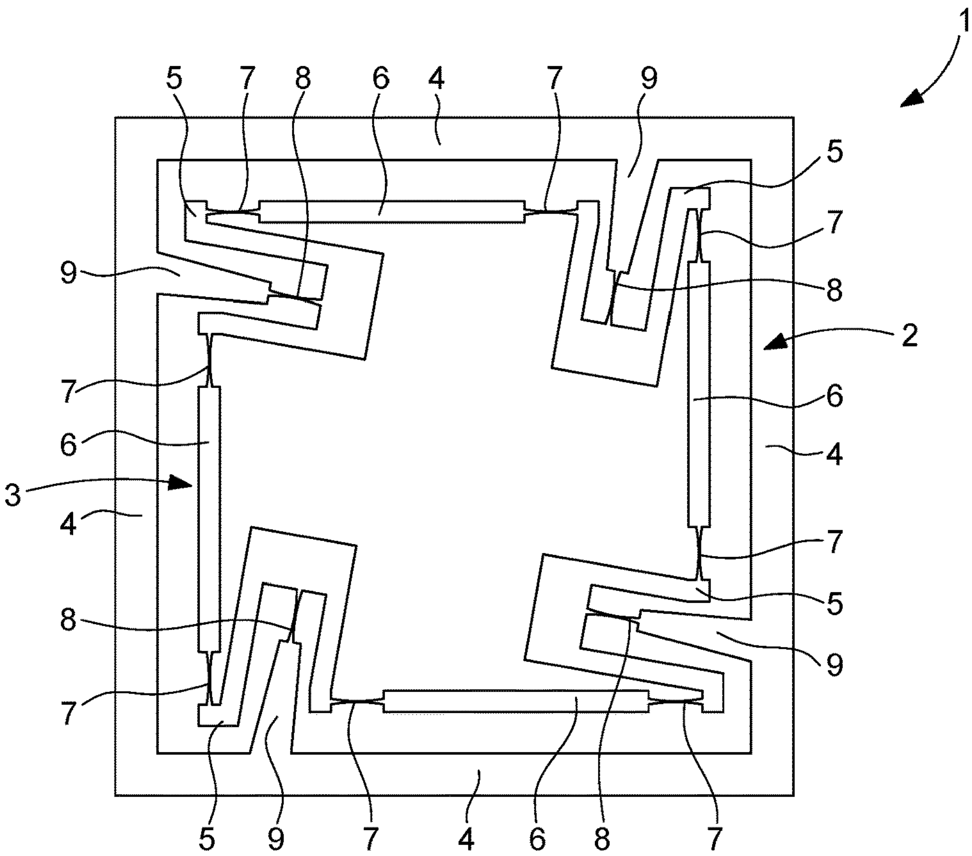
FIG. 1 is a schematic representation of a diaphragm type deployment device without shutters, according to a first embodiment of the invention.

The invention relates to a diaphragm type deployment device 1, 10, 20, particularly for watchmaking. In the embodiments below, the diaphragm type deployment device is for example a timepiece display device, for example a horological movement of a watch.

The deployment device comprises a first rigid armature 2 and a second deformable armature 3. The term rigid denotes an armature that is not intended to be flexible in normal use of this device 1, 10, 20, whereas the deformable armature is intended to be deformed during the use of the device 1, 10, 20.

The first rigid armature 2 comprises a square-shaped frame 4, each side being formed for example from an arm. The frame 4 defines an internal space wherein the second deformable armature 3 is arranged. Thus, the first rigid armature 2 delimits the outer perimeter of the device 1, whereas the second flexible armature 3 is arranged inside said perimeter.

By the flexibility thereof, the second deformable armature 3 can switch from a first extended configuration to a second compact configuration. The device 1 extends substantially in the same plane, when the second deformable armature 3 is in the first or in the second configuration.

The second deformable armature 3 has an arrangement comprising flexible portions 7, 8 and rigid portions 5, 6. The flexible portions 7, 8 connect the rigid portions 5, 6 to one another or connect rigid portions 5, 6 to the first rigid armature 2.

Each flexible portion 7, 8 comprises a flexible strip connected, either to the first rigid armature 2 by one end and to a rigid portion 5, 6 by the other end, or to two rigid portions 5, 6, by one end for each rigid portion 5, 6. The flexible strips preferably have a longitudinally elongated straight shape.

The rigid portions are rigid arms 5, 6, which can either be straight 6 or forming a U.

In the embodiment of FIGS. 1 to 5, the second deformable armature 3 alternatively comprises in series, a rigid arm and a flexible strip. More specifically, the deformable armature comprises in series, a group comprising in series a U-shaped rigid arm 5, a first straight flexible strip 7, a straight rigid arm 6, and a second flexible strip 7. The free ends of the flexible strips 7 are joined to the free ends of the rigid arms 5, 6. The flexible strips 7 and the straight arm 6 are substantially colinear, whereas the U is arranged perpendicularly to the strips in the plane of the second flexible armature. The end of the arms of the U is arranged at the ends of the flexible strips 7, the base thereof being substantially parallel with the straight rigid arm 6. The inside of the U is oriented towards the first rigid armature 2. The first rigid armature 2 comprises a catch 9 extending from each side towards the inside of each U of the second deformable armature 3.

The second deformable armature 3 thus comprises four groups placed in series to form a square inside the frame 4 of the first rigid armature 2, each group running along one side of the frame 4 inside the space of the frame 4. The groups are perpendicular in relation to one another. Each assembly comprises a U-shaped rigid arm, a first flexible strip 7, a straight rigid arm 6, and a second flexible strip 7.

The second deformable armature 3 is connected to the first rigid armature 2 by third flexible strips 8 arranged in line with the catch 9, each third flexible strip 8 connects the end of the catch 9 to the base of the U by entering the space defined by the U.

Thus, the first rigid armature 2 and the second deformable armature 3 are joined to one another by anchoring points defined at the end of each catch. These anchoring points locally define axes of rotation about which the deformable armature can rotate when it is deformed.

The device 1 comprises a shutter 11 arranged on each U-shaped rigid portion 5, preferably supported by the base of the U. The shutters 11 extend towards the centre of the device 1 to define an opening. The embodiment in FIGS. 1 to 4 comprises two pairs of opposite shutters 11 disposed perpendicularly in relation to one another. Each shutter 11 is arranged on the base of the U. A shutter has an elongated shape wherein the free end is separated with a hook-shaped rounded edge oriented towards the centre of the device 1. Two facing shutters 11 are substantially symmetrical in relation to the centre of the device 1. The shutters are distributed by angular symmetry according to an angle a between two shutters, where a=360/n; where n is the number of shutters of the device 1.

Each shutter 11 covers or is partially covered by the adjacent shutter 11. Thus, the rounded edges of the shutters form a substantially circular opening according to the arrangement of the shutters in relation to one another.

According to the invention, the first rigid armature 2 and the second deformable armature 3 form at least partially a one-piece assembly. Here, the whole first rigid armature 2 and the whole second deformable armature 3 form the one-piece assembly. The two armatures form a single continuous integral piece.

Preferably, the two armatures are formed from the same material. The material of the device 1 is to be selected for example from silicon, an Ni/P type nickel-phosphorus alloy, or an Fe/Ni/Co/Mo type steel alloy.

Thus, the two armatures 2, 3 are manufactured in the same method to save time and lower the manufacturing cost. Optionally, the shutters are also formed of one piece with the two armatures 2, 3, in the same material.

For silicon, the device 1 is preferably manufactured with a DRIE (Deep Reactive Ion Etching) type method.

A conventional LIGA type photolithography method is used to form the device 1 made of nickel-phosphorus alloy, or of steel alloy.

The device 1 comprises movement means, not shown in the figures, configured to switch the second deformable armature 3 from the compact configuration to the extended configuration and vice versa. These movement means can also be embodied by flexible elements.

For this purpose, the movement means exert a movement on at least one rigid portion of the second deformable armature 3.

Preferably, in this embodiment, the movement is exerted on a straight rigid arm 6. Preferably, the movement means exert a force on several straight rigid arms 6 of the second deformable armature 3.

The movement means comprise for example a control rod, which is connected by a shaft arranged through an opening in the straight rigid arm 6. On actuating the rod, the shaft pulls or pushes the straight rigid arm 6.

The movement means are configured to produce a substantially rectilinear movement of the straight rigid portion (s) 6 of the second group. Preferably, the movement is made along the longitudinal direction of straight arms 6.

On moving these rigid portions, the U-shaped rigid portions 5 are also moved by means of the flexible strips 7 which connect them to the straight rigid arms 6.

The U-shaped rigid portions 5 perform a rotation about the anchoring point thanks to the flexible strips 8 which connect them to the catches 9 of the first rigid armature 2. Thus, the shutters 11 move and change position according to the configuration of the device 1.

The device 1 defines a first opening when the second deformable armature 3 is in the first extended configuration, and it defines a second opening when the second deformable armature 3 is in the second compact configuration. The first opening being narrower than the second opening.

Figure 2:
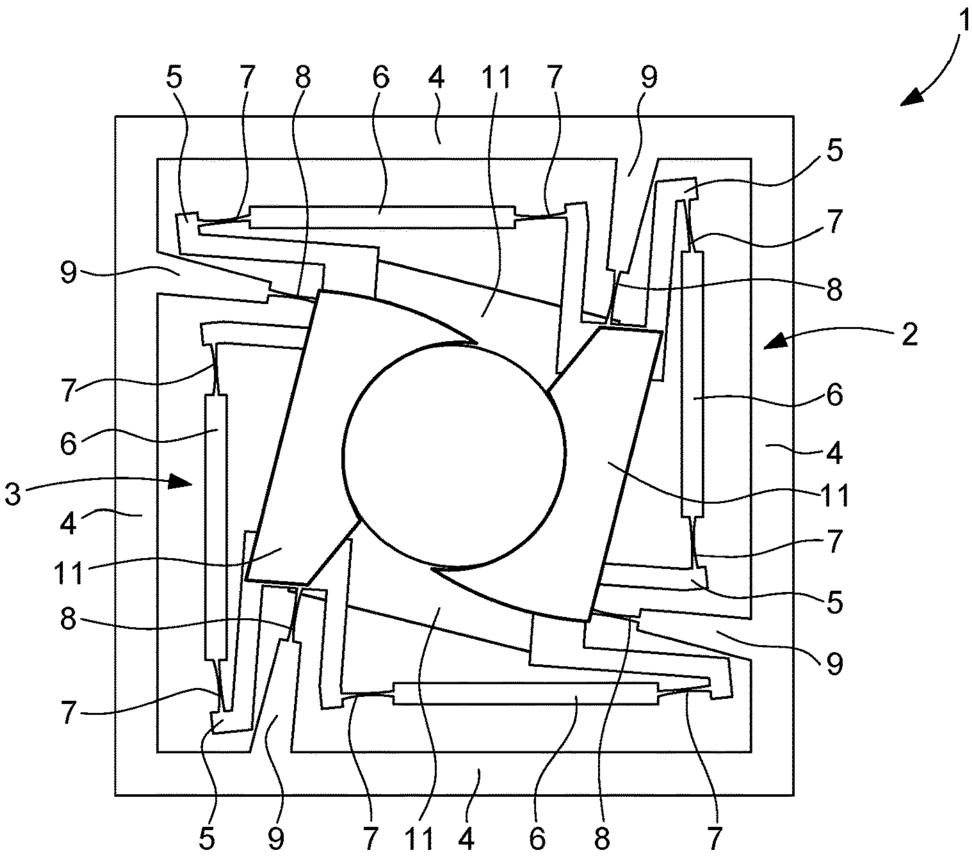
FIG. 2 is a schematic representation of the diaphragm type deployment device of the first embodiment of the invention in the compact configuration with shutters.

As shown in FIG. 2, the second deformable armature 3 is in the compact position, such that the shutters 11 are separated to form a wide opening. The straight rigid portions 6 are longitudinally close to the first rigid armature.

Figure 3:
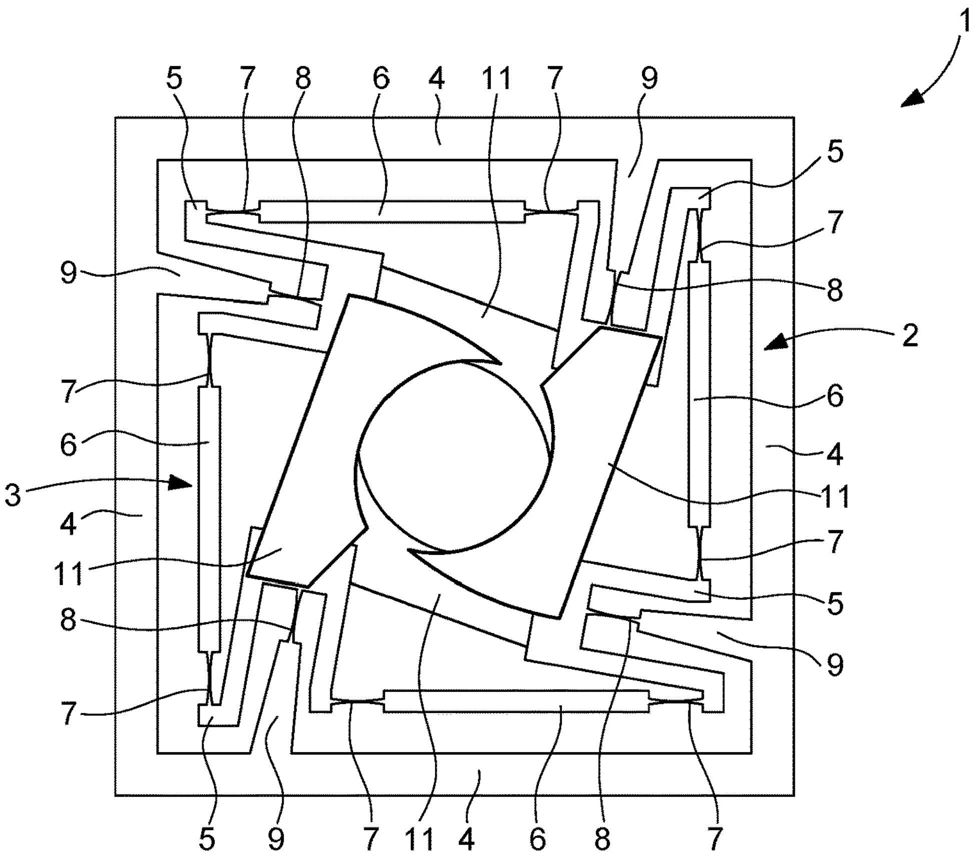
FIG. 3 is a schematic representation of the diaphragm type deployment device of the first embodiment of the invention in the intermediate configuration with shutters.

In FIG. 3, the second deformable armature 3 is in an intermediate position, the straight rigid portions 6 having been moved longitudinally to move them away from the first rigid armature 2. Thus, the opening of the device is narrower than the opening of the device 1 in FIG. 1.

Figure 4:
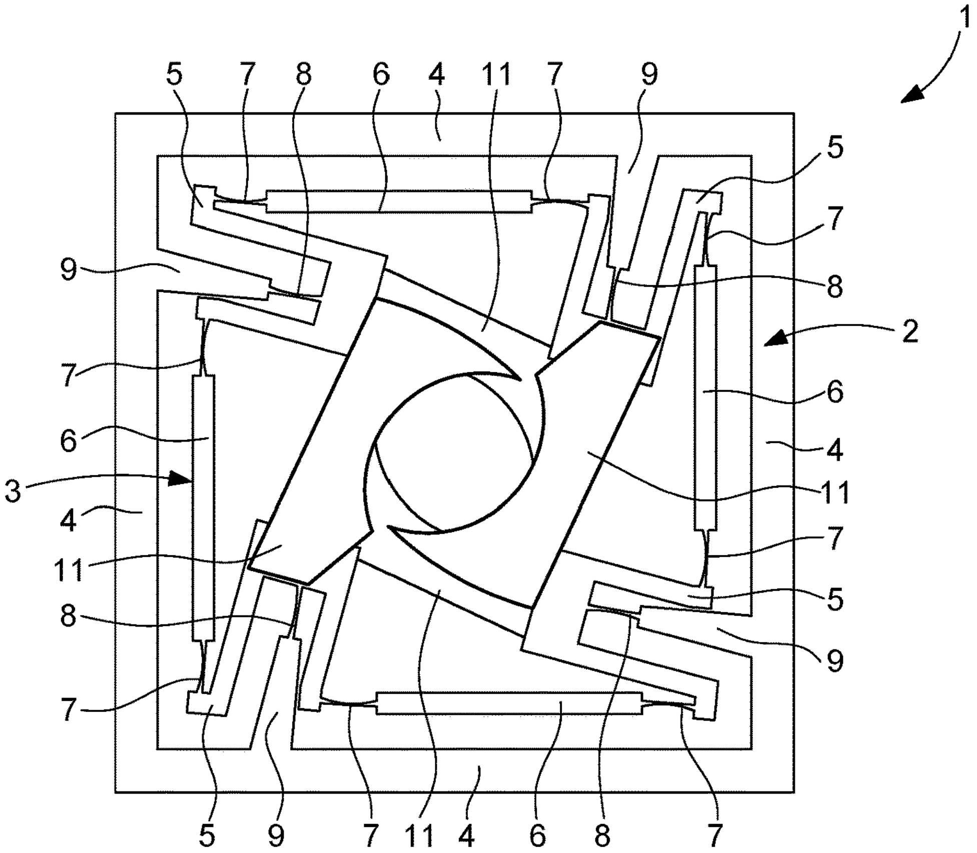
FIG. 4 is a schematic representation of the diaphragm type deployment device of the first embodiment of the invention in the extended configuration with shutters.

And in FIG. 4, the second deformable armature 3 is in the extended position, the straight rigid portions 6 being longitudinally farther away from the first rigid armature 2. Thus, an even narrower opening is obtained.

Preferably, the intermediate position is chosen as the rest position of the device, to be able to switch to the extended position or to the compact position more quickly. Indeed, the movement from the rest position to one of the two other positions is shorter, than if one of these two other positions is chosen as a rest position.

In a specific embodiment, the shutters 11 can overlap and completely close the opening, in order to form a screen without openings. The device 1 is completely closed in the extended configuration of the second flexible armature 3, for example in the case of a display device 1, where the diaphragm hides an item of information, such as the date or time.

Figure 5:
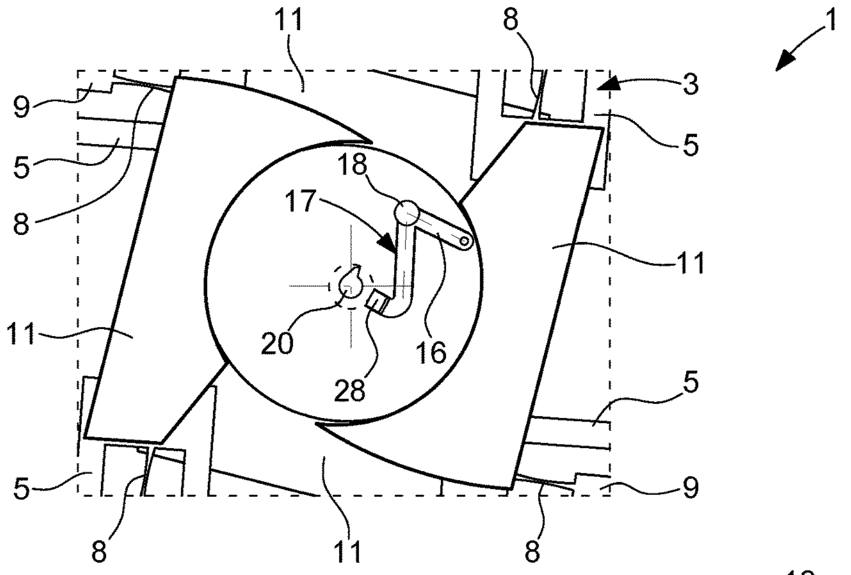
FIG. 5 is a schematic representation of the diaphragm type deployment device of the first embodiment of the invention applied to a system for locking a balance shaft.
Figure 6:
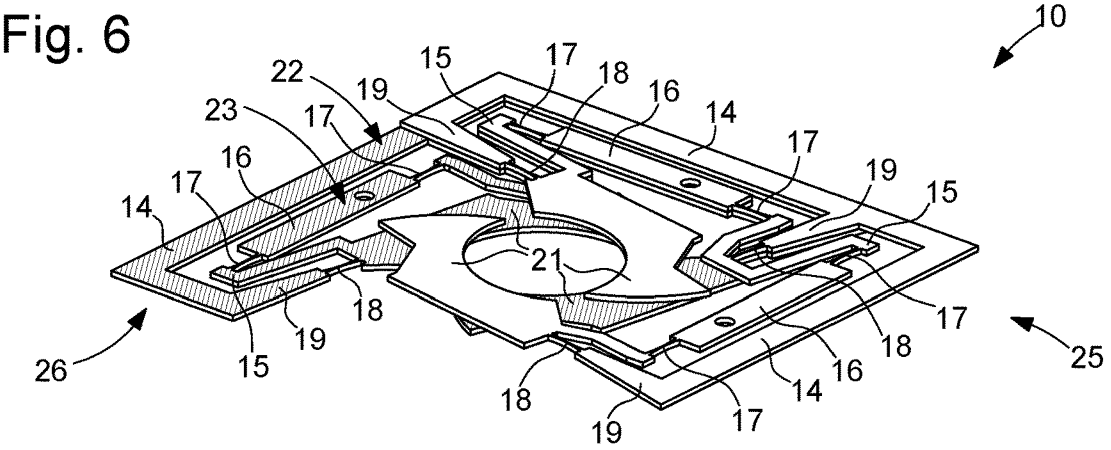
FIG. 6 is a schematic representation of a diaphragm type deployment device according to a second embodiment of the invention.

FIG. 5 is an example of application of the diaphragm type deployment device 1, applied to a system for locking a tourbillon type balance. In the extended position, the shutters 11 are directed towards the inside of the circle to come into contact with the control rod 16 of the stop lever 17 in order to rotate the stop lever 17 about the axis of rotation 18 thereof with a stopping portion 28 at the opposite end thereof to the control rod 16, to come into contact with a cam 20 on the shaft of the sprung-balance so as to stop it momentarily for a reset of the watch. This stop lever 17 can momentarily stop the operation of the watch by locking the sprung-balance at the axis of rotation 18 thereof, for example in contact with a balance stop cam 20 on the shaft of the spring-balance 14. The stop lever 17 is for example kept in a rest position by a spring fastened on one hand to the stop lever 17 between the control rod 16 and the axis of rotation 18, and on the other is fastened to the cage support.

In the second embodiment of FIGS. 6 to 9, the rigid 12 and deformable armatures 13 are embodied on two superposed layers 25, 26, the layers defining and first and a second superposed assembly. A first layer comprises a first part of the rigid 12 and deformable 13 armatures, as well as two shutters 21, whereas the second layer comprises a second part of the rigid 12 and deformable armatures 13, as well as two shutters 21. The two layers have a piece of the deployment device 1 in common, which comprises everything entering two catches of the rigid armature. In other words, one side of the device is reproduced in duplicate, once on each layer of the device 10.

Figure 7:
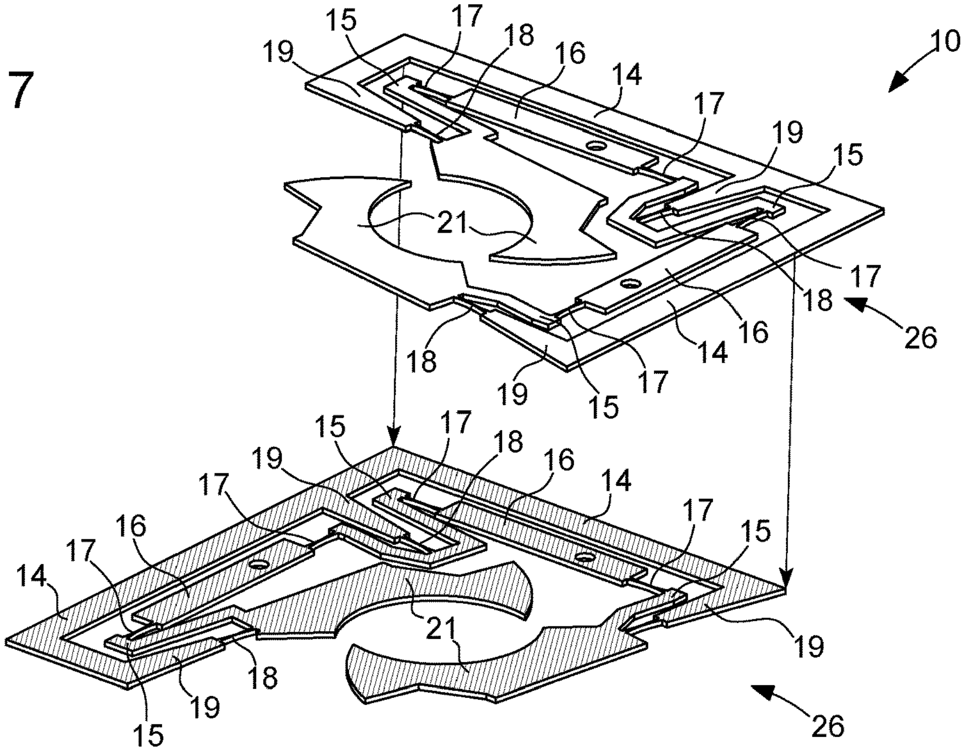
FIG. 7 is a separate schematic representation of the diaphragm type deployment device of the second embodiment of the invention.
Figure 8:
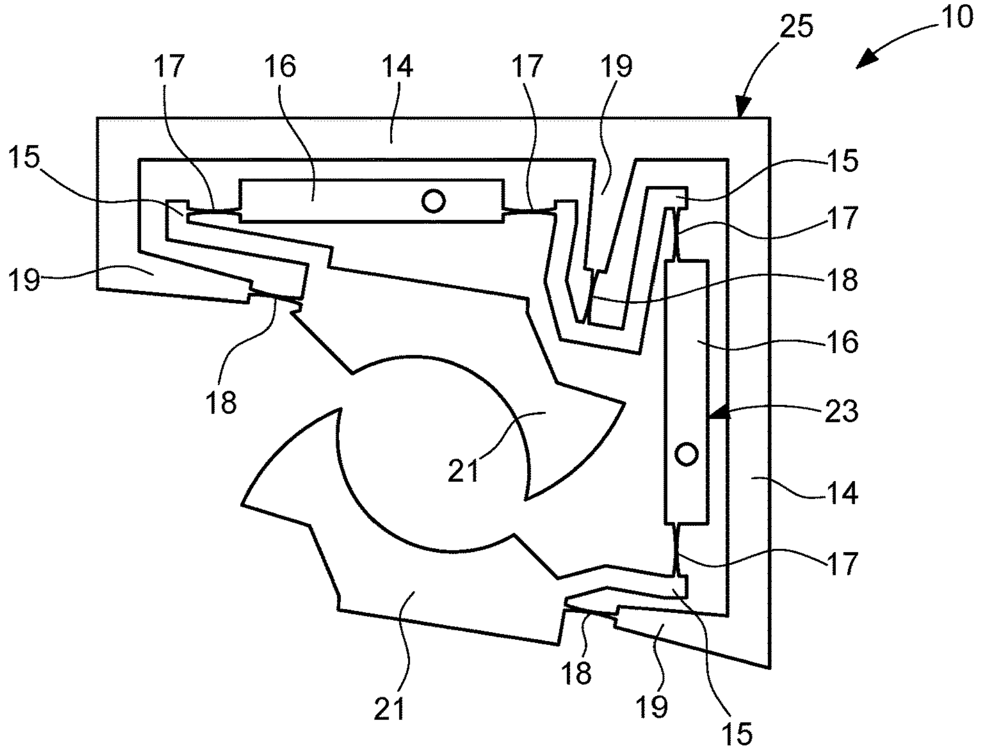
FIG. 8 is a schematic representation of a layer of the diaphragm type deployment device of the second embodiment of the invention.

In FIGS. 7 and 8, for the rigid armature 12, the first 25 layer includes one side of the device 10, as well as the corner up to the catch 19 of a second side, and a third opposite site, up to the next catch 19. For the deformable armature 13, the first layer 25 comprises the elements extending from the half of the U-shaped rigid portion 15 corresponding to the second side to the half of the U-shaped rigid portion 15 corresponding to the third opposite side. Furthermore, the first layer 25 includes two shutters 21 extending from each half of the U-shaped rigid portion 25.

The second layer 26 comprises the same configuration rotated by 90°, here to the left. Thus, with respect to the device 1 of the first embodiment, each layer 25, 26, comprises a whole side, as well as a quarter-side and three-quarters side at the two corners of the whole side.

To form the device 10, the two layers 25, 26 are superposed, in contact with one another. The two layers 25, 26 forming a 90° angle between one another. Some sides are formed by a single layer, whereas only one side is formed simultaneously in the two layers 25, 26.

The two superposed layers 25, 26 form a truncated device 10 with respect to the first embodiment of the device 1 of FIGS. 1 to 5, wherein a section of a side in the rigid armature 12 between two catches 19, and a section of the deformable armature 13 between two half-U-shaped rigid portions 15 are missing. Thus, a corner of the frame is missing, as well as two flexible strips 17 and a straight rigid portion 16 in addition to the two half-U-shaped rigid portions 15.

The operation of the device 10 is the same as that 1 of the first embodiment. When the three straight rigid portions 16 are moved longitudinally, the second deformable armature 13 is extended or compressed. The two opposite straight rigid portions 16 are moved in the opposite direction, whereas the third is moved perpendicularly in either direction according to the sought configuration.

Figure 9:
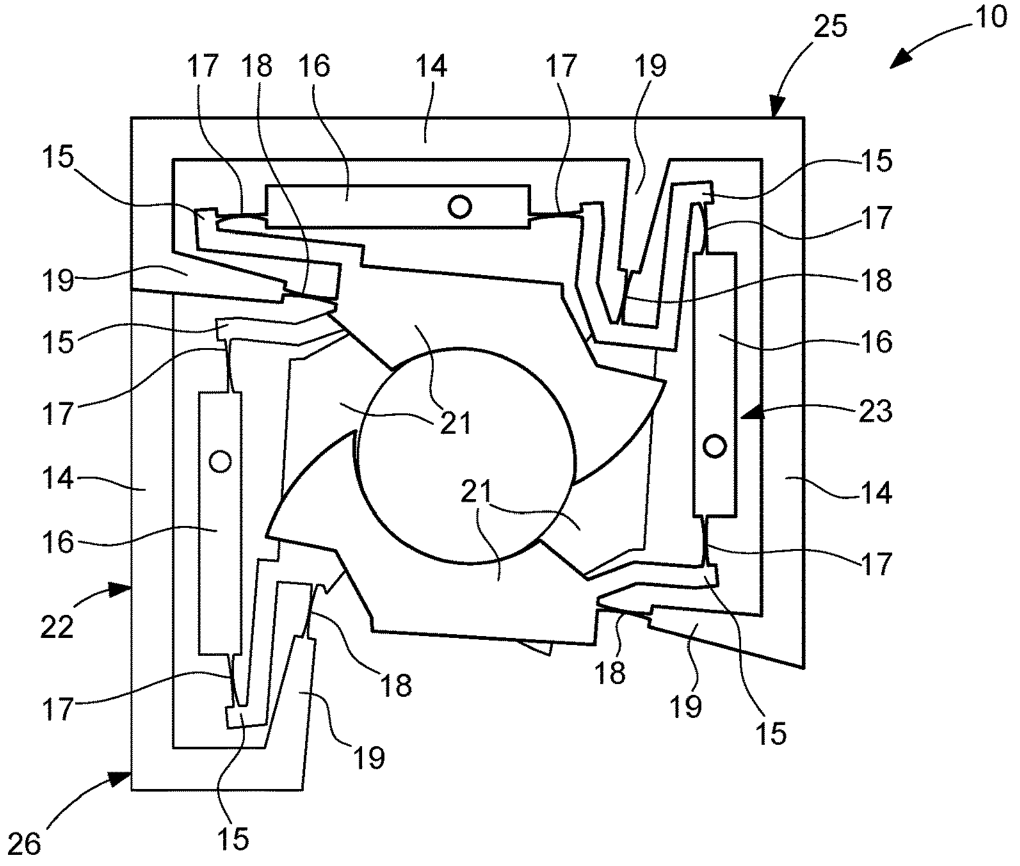
FIG. 9 is a schematic representation of the diaphragm type deployment device of the second embodiment of the invention in the compact configuration.
Figure 10:
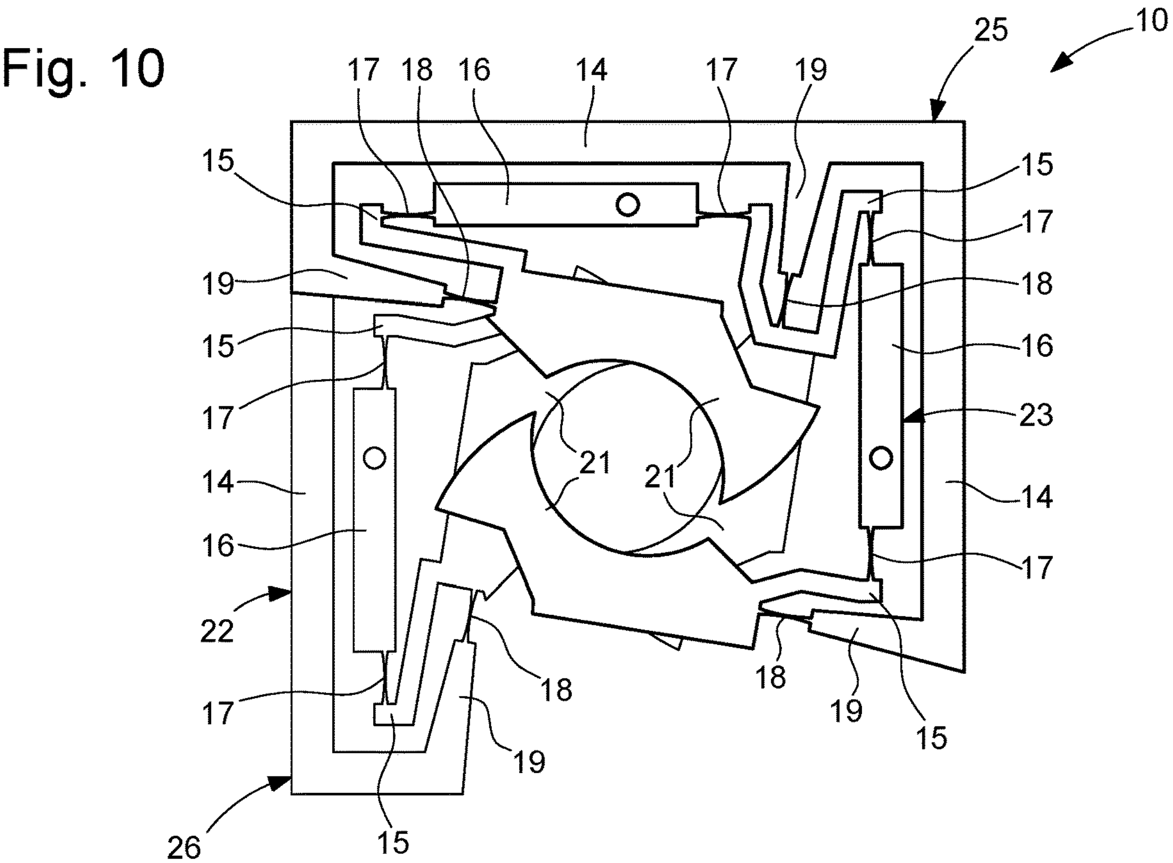
FIG. 10 is a schematic representation of the diaphragm type deployment device of the second embodiment of the invention in the intermediate configuration.
Figure 11:
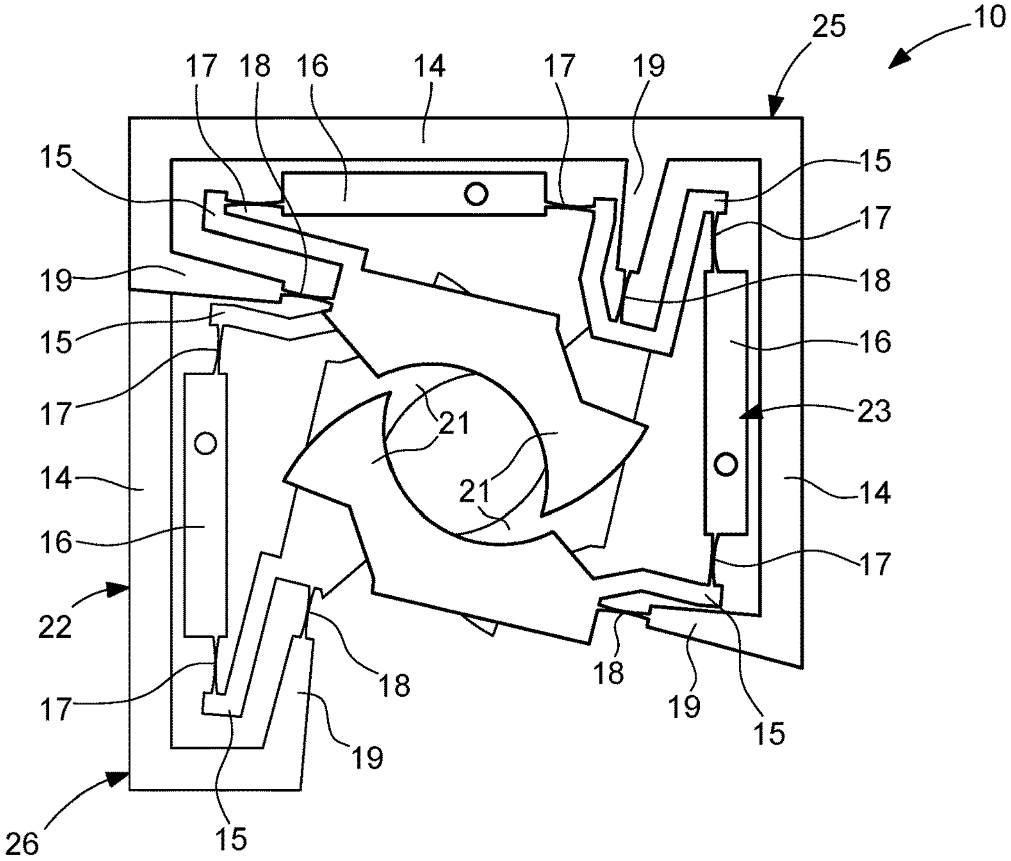
FIG. 11 is a schematic representation of the diaphragm type deployment device of the second embodiment of the invention in the extended configuration.

In FIG. 9, the extended configuration, the opening formed by the shutters 21 is wide. The opening is narrower in an intermediate position of the device 10, as represented in FIG. 10. In the compact configuration of FIG. 11, the opening is the narrowest.

The actuation of the device of this embodiment can be performed by means of a pin passing through the two rigid elements 16 of the two layers 25, 26. The pin is for example actuated by a mobile control arm including an oblong hole wherein the pin is inserted.

Figure 12:
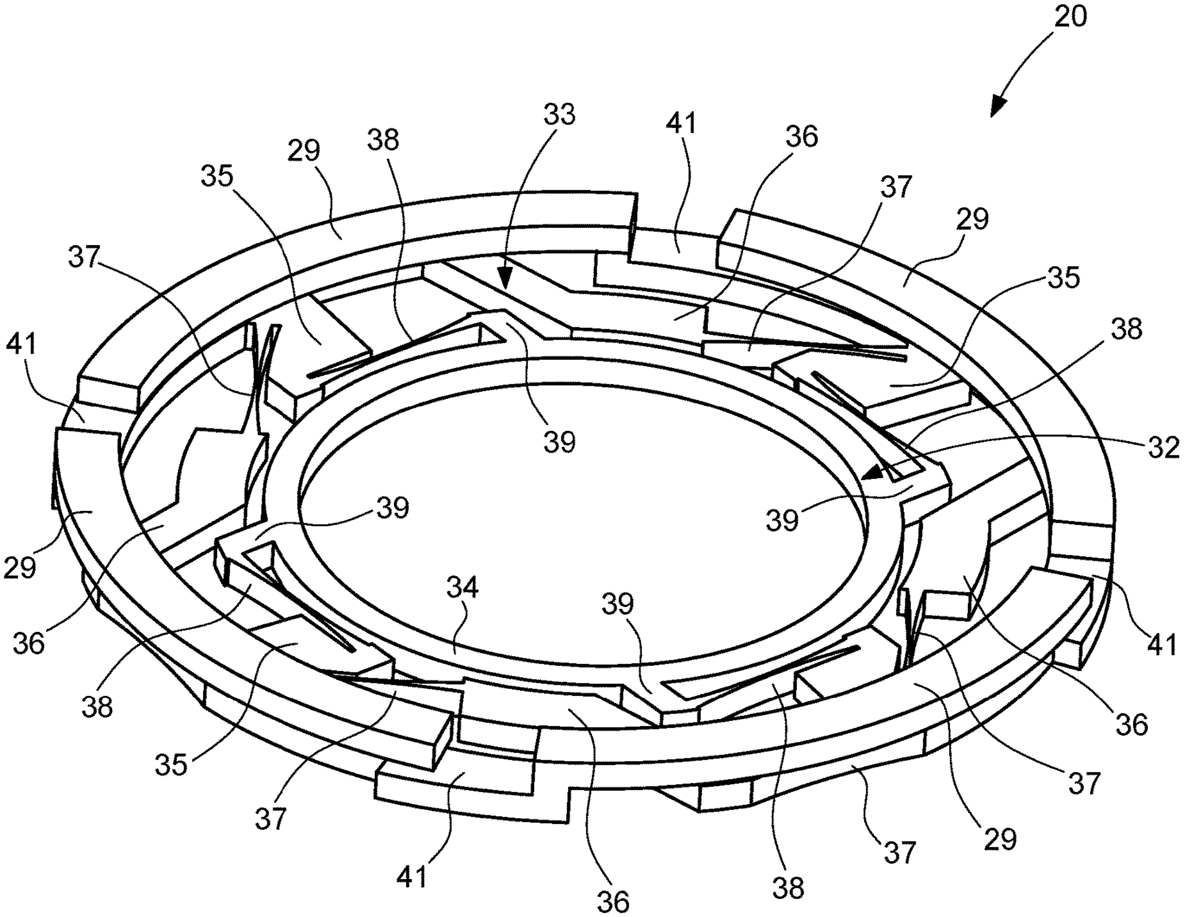
FIG. 12 is a schematic representation of a diaphragm type deployment device according to a third embodiment of the invention.
Figure 13:
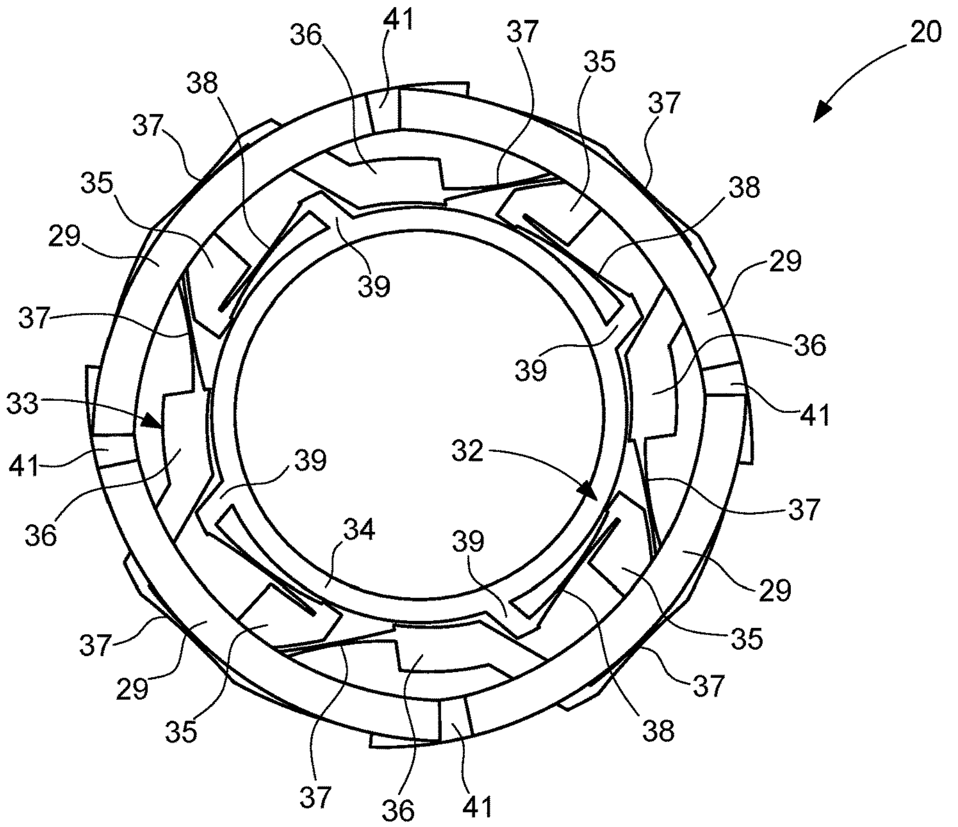
FIG. 13 is a schematic representation of the diaphragm type deployment device of the third embodiment of the invention in the compact configuration.
Figure 14:
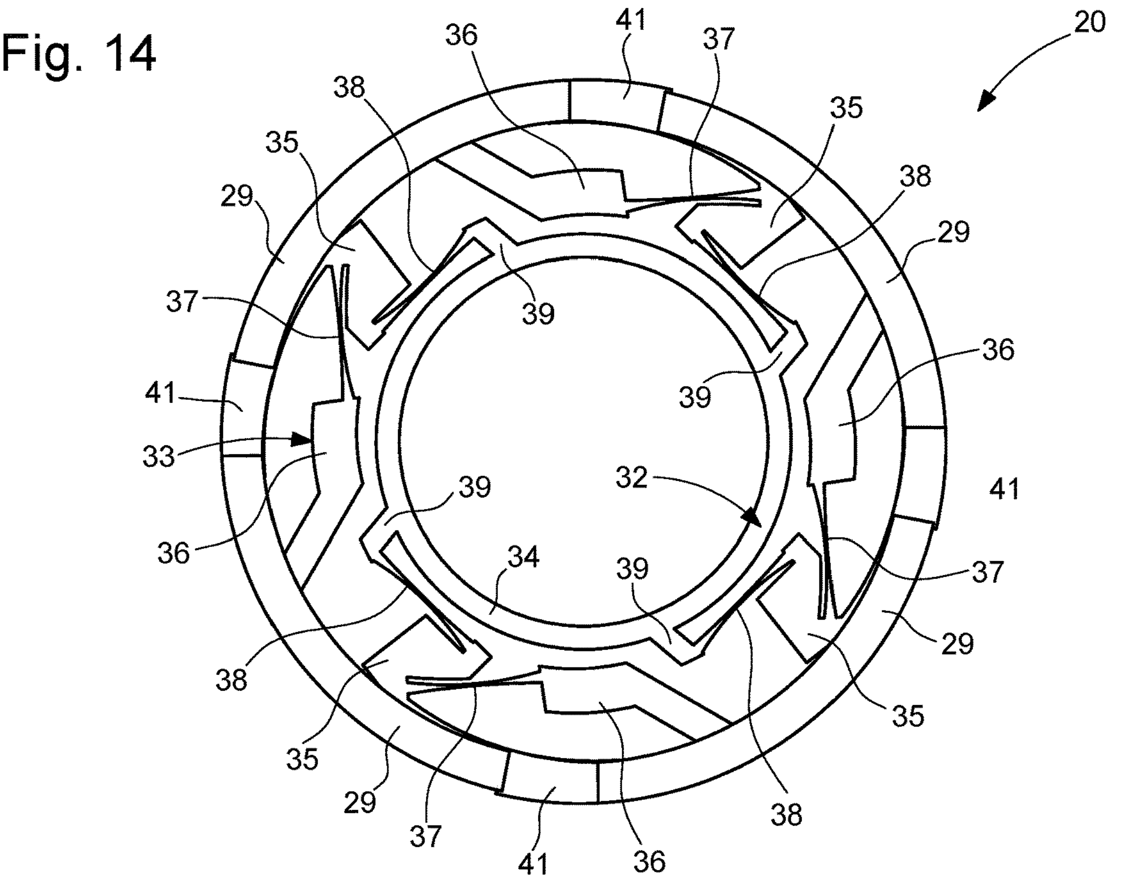
FIG. 14 is a schematic representation of the diaphragm type deployment device of the third embodiment of the invention in the extended configuration.

The third embodiment of the diaphragm type deployment device 20, represented in FIGS. 12 to 14, comprises a ring-shaped division equipped with catches 39 distributed angularly around the ring, on the external side thereof. The deformable armature extends outwards around the rigid armature. The second deformable armature 33 delimits the outer perimeter of the diaphragm, the first armature 32 being arranged inside said perimeter. The device 20 is substantially flat and extends essentially in one plane.

The second deformable armature 33 comprises rigid portions 35, 36 and flexible portions 37, 38. The second deformable armature 33 comprises first 35 and second rigid portions 36, preferably four each, which are distributed alternatively around the ring. The first rigid portions 35 have a triangular shape with an external protrusion and a front protrusion having two opposite tips. And the second rigid portions 36 have a bent elongated shape.

The flexible portions comprise flexible strips 37, 38 connecting the rigid portions 35, 36 to one another, as well as the first rigid portions 35 to the catches 39 of the central ring. A first flexible strip 38 is arranged in series between a protrusion of the triangle and a catch 39, whereas a second flexible strip 37 is arranged between the other protrusion and an external end of the bent rigid portion 36. Finally, a third strip 37 is arranged in series between the other end of the bent rigid portion 36 and the external protrusion of the first rigid portion 35.

The device 20 furthermore comprises several arc-shaped sabots 29, here 4, each arranged on the triangular rigid portion 35. The sabots 29 are preferably one-piece with each triangular rigid portion 35, and extend from the external outgrowth of the triangular rigid portion 35. The sabots 29 form the circular periphery of the device, which moves away from the ring, when the deformable armature is extended, and which moves closer to the ring, when the deformable armature is compact.

Each sabot 29 comprises a staging 41 to be superposed in part on the arc of the adjacent sabot 29. Regardless of the configuration of the device 20 in the compact or extended position, the sabots 29 are more or less superposed. Thus, the sabots 29 can move in relation to one another, while forming a continuous barrier around the device 20, regardless of the configuration thereof. This barrier can come into contact with other elements of the horological movement to release or lock a mechanism.

In the extended position of the device 20, the sabots form a substantially circular barrier around an axis, whereas in the compact position of the device 20, the sabots 29 are skewed in relation to one another, while retaining an overlap between adjacent sabots 29.

According to the invention, for this embodiment, the whole first rigid armature 32 and the whole second deformable armature 33 form a one-piece assembly.

In this embodiment, the movement means are connected to the first rigid portions 35, so as to impel a rotary movement about an axis passing through them. Thus, the movement means are configured to produce a rotary movement of the first rigid portions 35, and hence enable the sabots 29 to be moved apart or closer together. The first flexible strips 38 are used to connect the second deformable armature 33 to the first rigid armature 32, as well as means for returning the first rigid portions 35 to the position corresponding to the compact configuration.

Rotating the first rigid portions 35 induces the movement of the sabots towards the outside of the device 20 in one direction of rotation, and towards the inside of the device 20 in the opposite direction. Simultaneously, the sabots 29 rotate slightly on themselves to switch from a first position corresponding to the compact configuration to a second position corresponding to the extended configuration, and vice versa.

The second rigid portions 36 also rotate on themselves thanks to the first flexible strips 37, following the rotation of the first rigid portions 37. The second rigid portions 36 serve to rigidify the second deformable armature 33.

Such a device 20 can be used in a locking system, for example of a tourbillon, or coupling system, for example between two superposed trains. For example, the diaphragm supports a cam arranged at a distance from the device to release the system. In the extended position, the diaphragm moves away and applies a force against the cam or a blom stud.

Obviously, the present invention is not restricted to the examples illustrated but is suitable for various alternative embodiments and modifications which will be obvious to a person skilled in the art. Other applications are possible, wherein the diaphragm forms for example a cam wherein the geometry is variable. The flexible strips can also have a bar shape with flexible necks, or be replaced by a combination of strips, which can be crossed or straight, or be replaced by a flexible element.

The invention claimed is:

1. A diaphragm type deployment device, for watchmaking, the device comprising a first rigid armature and a second deformable armature, the first rigid armature and the second deformable armature being connected to one another, such that the second deformable armature switches from a first extended configuration to a second compact configuration, and vice versa, the device defining a first geometry when the second deformable armature is in the first extended configuration, and defining a second smaller geometry than the first geometry, when the second deformable armature is in the second compact configuration, the device extending substantially in the same plane when the second armature is in the first or in the second configuration, wherein at least a first part of the first rigid armature and at least a first part of the second deformable armature form a first one-piece assembly.

2. The device according to claim 1, wherein the entire first rigid armature and the entire second deformable armature form the first one-piece assembly.

3. The device according to claim 1, wherein a second part of the first rigid armature and a second part of the second deformable armature form a second one-piece assembly.

4. The device according to claim 3, wherein the first assembly and the second assembly are superposed on one another.

5. The device according to claim 1, wherein the first rigid armature delimits the outer perimeter of the diaphragm, the second armature being arranged inside said perimeter.

6. The device according to claim 5, wherein the first geometry defines a first opening when the second deformable armature is in the first extended configuration, and the second geometry defines a second opening, when the second deformable armature is in the second compact configuration, the first opening being narrower than the second opening.

7. The device according to claim 6, wherein the second deformable armature comprises at least two mobile shutters, the shutters being distributed by angular symmetry.

8. The device according to claim 7, each of the shutters being arranged on a different rigid portion of the second deformable armature.

9. The device according to claim 7, wherein the shutters delimit the first opening of the first configuration and the second opening of the second configuration.

10. The device according to claim 1, wherein the second deformable armature delimits the outer perimeter of the diaphragm, the first rigid armature being arranged inside said perimeter.

11. The device according to claim 10, wherein the first geometry defines a first perimeter when the second deformable armature is in the first extended configuration, and the second geometry defines a second perimeter, when the second deformable armature is in the second compact configuration, the first perimeter being greater than the second perimeter.

12. The device according to claim 11, wherein the second deformable armature comprises at least one sabot making it possible to delimit the variable perimeter of the device, each sabot being arranged on a different rigid portion of the second deformable armature.

13. The device according to claim 1, wherein the second deformable armature comprises first deformable portions and rigid portions assembled in alternation, a first deformable portion connecting a rigid portion to a next rigid portion.

14. The device according to claim 13, wherein the second deformable armature comprises second deformable portions connecting every other rigid portion to the first rigid armature.

15. The device according to claim 14, wherein the rigid portions connected to the first rigid armature have different shapes from the other rigid portions.

16. The device according to claim 13, wherein each deformable portion comprises a flexible strip connected by the ends thereof to two rigid portions, or to a rigid portion and the first rigid armature.

17. The device according to claim 13, wherein it comprises means for moving at least one rigid portion, in order to switch the second deformable armature from the extended configuration to the compact configuration and vice versa.

18. The device according to claim 17, wherein the rigid portion(s) moved by the movement means are rigid portions connected to the first rigid armature.

19. The device according to claim 18, wherein the movement means are configured to produce a rotary movement of the rigid portion(s).

20. The device according to claim 17, wherein the rigid portion(s) moved by the movement means are rigid portions which are not connected to the first rigid armature.

21. The device according to claim 20, wherein the movement means are configured to produce a substantially rectilinear movement of the rigid portion(s).

22. The device according to claim 17, wherein the rigid portions connected to the first rigid armature are subjected to a rotary movement about a pivoting point when the second deformable armature switches from the extended configuration to the compact configuration and vice versa.

23. The device according to claim 1, the material of the device is to be selected from silicon, an Ni/P type nickel-phosphorus alloy, an Fe/Ni/Co/Mo type steel alloy.

24. A timepiece, comprising the device according to claim 1.

25. The device according to claim 1, wherein the first part of the first rigid armature and the first part of the second deformable armature are formed from the same material.

* * * * *